(12) United States Patent
Inagi

(10) Patent No.: US 11,514,262 B2
(45) Date of Patent: Nov. 29, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Seiya Inagi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 834 days.

(21) Appl. No.: 16/378,582

(22) Filed: Apr. 9, 2019

(65) Prior Publication Data

US 2020/0082216 A1 Mar. 12, 2020

(30) Foreign Application Priority Data

Sep. 10, 2018 (JP) .............................. JP2018-168821

(51) Int. Cl.
*G06K 9/62* (2022.01)
(52) U.S. Cl.
CPC ........... *G06K 9/6226* (2013.01); *G06K 9/623* (2013.01); *G06K 9/6223* (2013.01); *G06K 9/6248* (2013.01); *G06K 9/6276* (2013.01)
(58) Field of Classification Search
CPC .... G06K 9/6226; G06K 9/6223; G06K 9/623; G06K 9/6276
USPC .......................................................... 703/2
See application file for complete search history.

(56) References Cited

U.S. PATENT DOCUMENTS

| | | | |
|---|---|---|---|
| 8,566,260 B2 | 10/2013 | Suzuki et al. | |
| 9,690,969 B2 | 6/2017 | Okamoto | |
| 2003/0147558 A1* | 8/2003 | Loui | G06K 9/6268 382/228 |
| 2004/0126782 A1* | 7/2004 | Holden | G06K 9/6226 435/6.14 |
| 2012/0265262 A1* | 10/2012 | Osorio | A61N 1/36146 607/45 |

FOREIGN PATENT DOCUMENTS

| | | |
|---|---|---|
| JP | 2012079286 | 4/2012 |
| JP | 2016029526 | 3/2016 |

* cited by examiner

*Primary Examiner* — Jeffery A Williams
(74) *Attorney, Agent, or Firm* — JCIPRNET

(57) ABSTRACT

An information processing apparatus includes an acquisition unit, a calculation unit, and a generation unit. The acquisition unit acquires information including information regarding multiple nodes and information regarding multiple links connecting the multiple nodes and acquires constraint information regarding node pairs included in the multiple nodes. The constraint information includes a positive constraint and a negative constraint. The calculation unit calculates, for each of multiple clusters, a classification proportion into which the multiple nodes are classified and calculates a degree of importance of each of the multiple clusters. The classification proportion represents a proportion in which each of the multiple nodes is classified as one of the multiple clusters. The generation unit generates a probability model for performing probabilistic clustering on the multiple nodes. The probability model is generated by using at least each of the information regarding the links, the constraint information, the classification proportion, and the degree of importance.

12 Claims, 8 Drawing Sheets

$$\begin{bmatrix} 0 & 1 & 0 & 1 \\ 1 & 0 & -1 & 2 \\ 0 & -1 & 0 & -3 \\ 1 & 2 & -3 & 0 \end{bmatrix}$$

NEGATIVE CONSTRAINT IS PLACED.
ABSOLUTE VALUE REPRESENTS
DEGREE OF CONSTRAINT.

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-168821 filed Sep. 10, 2018.

BACKGROUND (i) Technical Field

The present disclosure relates to an information processing apparatus and a non-transitory computer readable medium.

(ii) Related Art

For example, Japanese Unexamined Patent Application Publication No. 2016-29526 describes an information processing apparatus that performs network-based soft clustering. The information processing apparatus includes an acquisition unit and a classification proportion calculation unit. The acquisition unit acquires network information including multiple nodes and multiple links connecting the nodes. The acquisition unit also acquires granularity for classifying the multiple nodes into multiple components. The classification proportion calculation unit calculates a classification proportion in which each of the multiple nodes is classified as one of the components. The classification proportion calculation unit calculates the classification proportion for each of the multiple components by using values of a first contribution and a second contribution. The first contribution takes on a high value as the classification proportion of the component having a link with the node becomes high. The second contribution takes on a high value as a proportion of the component to the total components becomes high.

SUMMARY

When there are two or more nodes classified as different clusters in performing a clustering method that probabilistically expresses a degree of linkage between nodes, it is not possible to perform the probabilistic clustering in some cases.

Aspects of non-limiting embodiments of the present disclosure relate to an information processing apparatus and a non-transitory computer readable medium that enable probabilistic clustering to be performed when there are two or more nodes classified as different clusters.

According to an aspect of the present disclosure, there is provided an information processing apparatus including an acquisition unit, a calculation unit, and a generation unit. The acquisition unit acquires information including information regarding multiple nodes and information regarding multiple links connecting the multiple nodes and acquires constraint information regarding node pairs included in the multiple nodes. The constraint information includes a positive constraint and a negative constraint. The calculation unit calculates, for each of multiple clusters, a classification proportion into which the multiple nodes are classified and calculates a degree of importance of each of the multiple clusters. The classification proportion represents a proportion in which each of the multiple nodes is classified as one of the multiple clusters. The generation unit generates a probability model for performing probabilistic clustering on the multiple nodes. The probability model is generated by using at least each of the information regarding the links, the constraint information, the classification proportion, and the degree of importance.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

BRIEF DESCRIPTION OF THE DRAWINGS

Exemplary embodiments of the present disclosure will be described in detail based on the following figures, wherein.

DETAILED DESCRIPTION

Hereinafter, an example of an exemplary embodiment for implementing the present disclosure will be described in detail with reference to the drawings.

First Exemplary Embodiment

Figure 1:
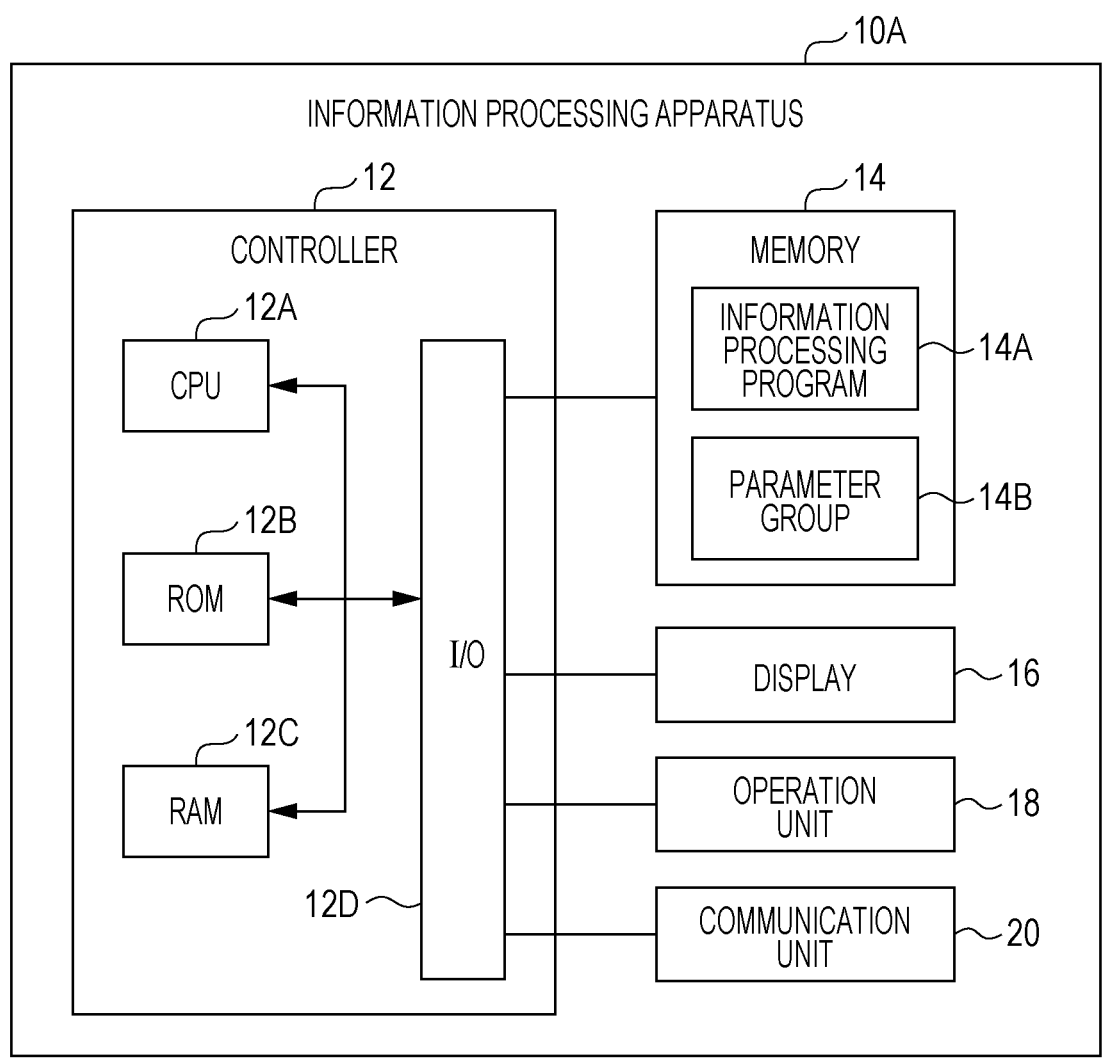
FIG. 1 is a block diagram illustrating an example electrical configuration of an information processing apparatus according to a first exemplary embodiment.

FIG. 1 is a block diagram illustrating an example electrical configuration of an information processing apparatus 10A according to a first exemplary embodiment.

As illustrated in FIG. 1, the information processing apparatus 10A according to this exemplary embodiment includes a controller 12, a memory 14, a display 16, an operation unit 18, and a communication unit 20.

A general-purpose computer such as a personal computer (PC) is applied to the information processing apparatus 10A according to this exemplary embodiment. A portable terminal device such as a smartphone or a tablet terminal may also be applied to the information processing apparatus 10A.

The controller 12 includes a central processing unit (CPU) 12A, a read only memory (ROM) 12B, a random access memory (RAM) 12C, and an input/output interface (I/O) 12D. These components are connected to each other via a bus.

Functional components including the memory 14, the display 16, the operation unit 18, and the communication unit 20 are connected to the I/O 12D. These functional components are enabled to communicate with the CPU 12A to and from each other via the I/O 12D.

The controller 12 may be provided as a sub controller that controls some of the operations of the information processing apparatus 10A or may be provided as part of a main controller that controls overall operations of the information processing apparatus 10A. An integrated circuit such as a large scale integration (LSI) circuit or an integrated circuit (IC) chipset is used for part or all of the blocks of the controller 12. Individual circuits may be used for the blocks, or a circuit that integrates part or the entirety of the blocks may be used. The blocks may be integrated as one block, or at least one block may be provided separately. In addition, part of each block may be provided separately. Not only the LSI circuit but also a dedicated circuit and a general-purpose processor may be used for the circuit integration of the controller 12.

For example, a hard disk drive (HDD), a solid state drive (SSD), or a flash memory is used as the memory 14. The memory 14 stores an information processing program 14A for executing a probabilistic clustering process according to this exemplary embodiment. The information processing program 14A may be stored in the ROM 12B. The memory 14 also stores a parameter group 14B used for the probabilistic clustering process.

The information processing program 14A may be installed in advance, for example, in the information processing apparatus 10A. The information processing program 14A may be implemented in such a manner as to be stored in a nonvolatile recording medium or distributed via a network and then being appropriately installed in the information processing apparatus 10A. Examples of the nonvolatile recording medium are considered to include a compact disc read only memory (CD-ROM), a magneto-optical disk, a HDD, a digital versatile disc read only memory (DVD-ROM), a flash memory, and a memory card.

For example, a liquid crystal display (LCD) or an electro luminescence (EL) display is used as the display 16. The display 16 may integrally include a touch panel. The operation unit 18 is provided with an input operation device such as a keyboard or a mouse. The display 16 and the operation unit 18 receive various instructions from a user of the information processing apparatus 10A. The display 16 displays various pieces of information such as a result of a process executed in response to an instruction received from the user and a notification regarding the process.

The communication unit 20 is connected to a network such as the Internet, a local area network (LAN), or a wide area network (WAN) and is thus enabled to communicate with an external apparatus such as an image forming apparatus or a PC via the network.

As described above, when there are two or more nodes classified as different clusters in performing the clustering method that probabilistically expresses a degree of linkage between nodes, it is not possible to perform the probabilistic clustering in some cases.

Figure 2:
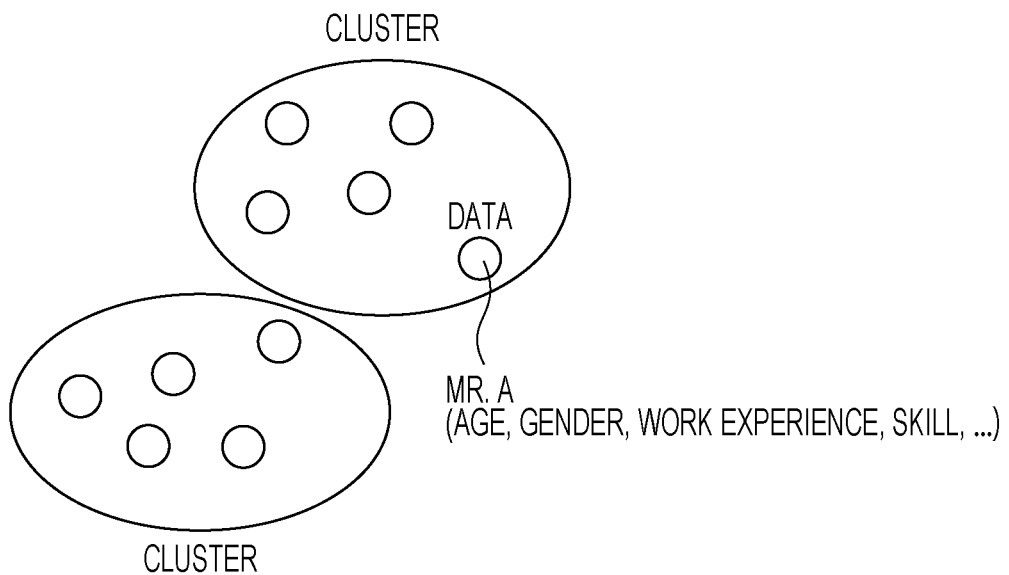
FIG. 2 is a diagram for explaining a clustering process.

FIG. 2 is a diagram for explaining a clustering process.

As illustrated in FIG. 2, a cluster denotes a group of data items (also referred to as nodes) having similar characteristics, and classifying a large number of data items into multiple clusters is referred to as clustering.

For example, when data is vector data representing the characteristics of persons, the aforementioned clustering denotes finding a group of persons having similar characteristics. Examples of a vector data clustering method include the k-means method, the Gaussian mixture model (GMM) method, and the ward method.

Figure 3:
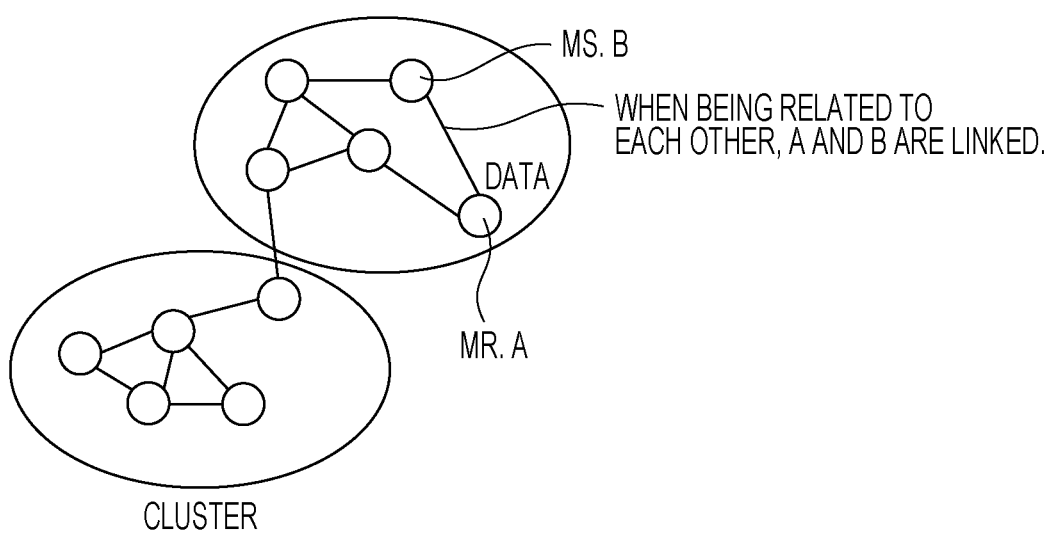
FIG. 3 is a diagram for explaining a clustering process in a network.

FIG. 3 is a diagram for explaining a clustering process in a network.

As illustrated in FIG. 3, a network data item is a data item representing a linkage (=link) between data items (=nodes).

Examples of the network include a network representing a human relationship by connecting persons who communicates with each other by e-mail or telephone and a network representing a reference relationship by connecting documents that reference another document and are referenced. Examples of a network data clustering method include the so-called modular decomposition of Markov chain (MDMC) method described in Japanese Unexamined Patent Application Publication No. 2016-29526, the Louvain method, and the Infomap method. Hereinafter, the clustering process in a network is also referred to as a probabilistic clustering process.

Figure 4:
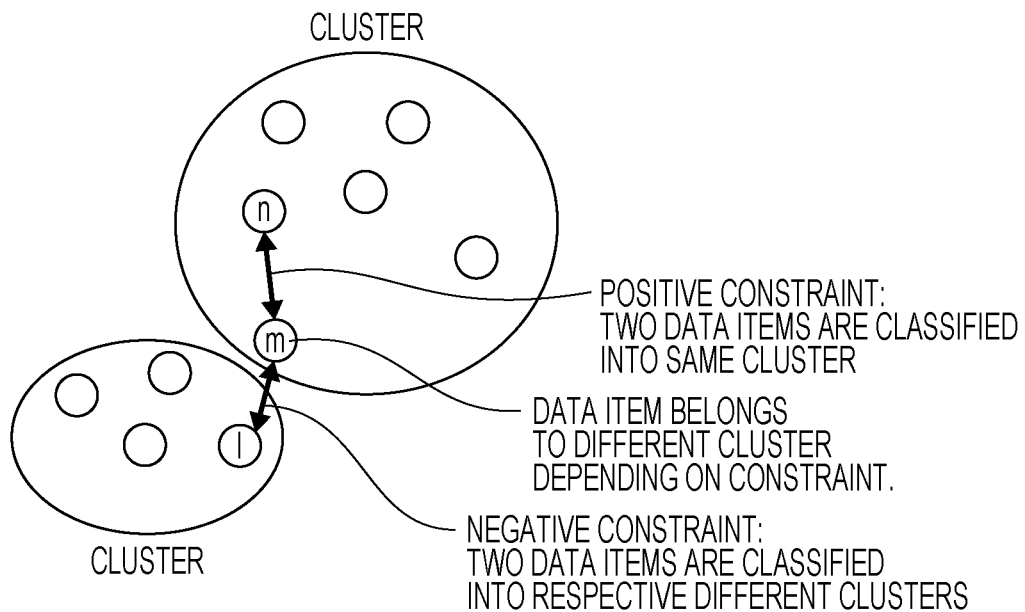
FIG. 4 is a diagram for explaining a relationship between the clustering process and constraints.

FIG. 4 is a diagram for explaining a relationship between the clustering process and constraints.

As illustrated in FIG. 4, there is a method in which a potential knowledge not appearing in data is provided as a constraint and thereby the accuracy of the clustering process is enhanced. Specifically, examples of the method for vector data include constrained (COP)—kmeans method and the hidden Markov random fields (HMRF)—kmeans method.

The aforementioned constraint includes a positive constraint and a negative constraint. The positive constraint is a constraint by which two data items are classified as the same cluster. For example, Mr. n and Mr. m are closely related to each other, and the relationship is known although the relationship does not appear in the data. In this case, the positive constraint is placed. In contrast, the negative constraint is a constraint by which the two data items are classified as respective different clusters. For example, Mr. m and Mr. l are closely related to each other, and the relationship appears in data. However, actually, Mr. m and Mr. l are slightly related. If the relationship is known, the negative constraint is placed.

Figure 5:
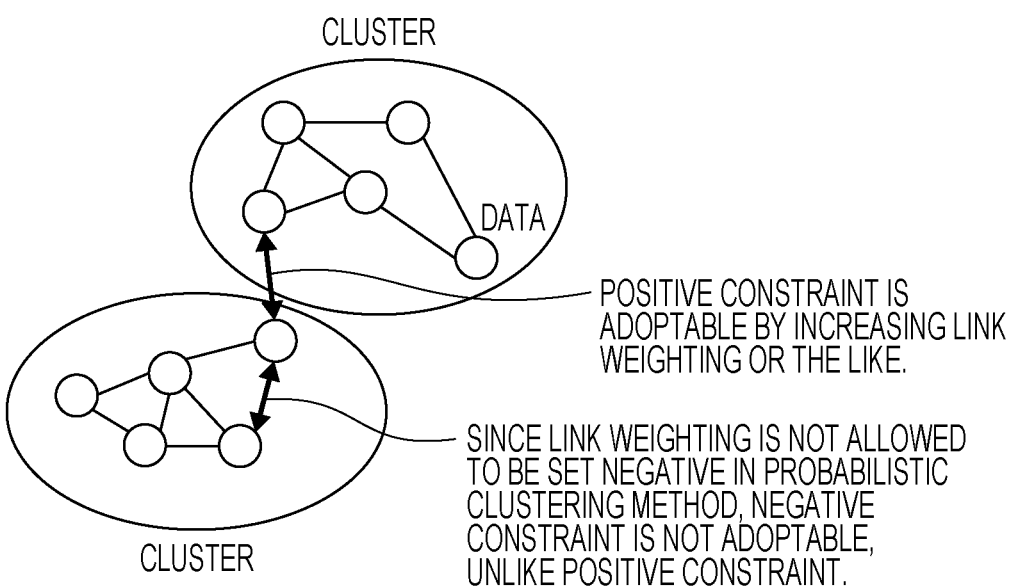
FIG. 5 is a diagram for explaining a relationship between a probabilistic clustering process and the constraints.

FIG. 5 is a diagram for explaining a relationship between the probabilistic clustering process and the constraints.

As illustrated in FIG. 5, the probabilistic clustering process is adoptable by increasing the weighting of the positive constraint or the like. In contrast, the negative constraint does not allow the weighting of the link to be set negative and thus is not adoptable, unlike the positive constraint. Accordingly, there is a desire for the probabilistic clustering process enabled to be executed on the basis of the positive and negative constraints.

Figure 6:
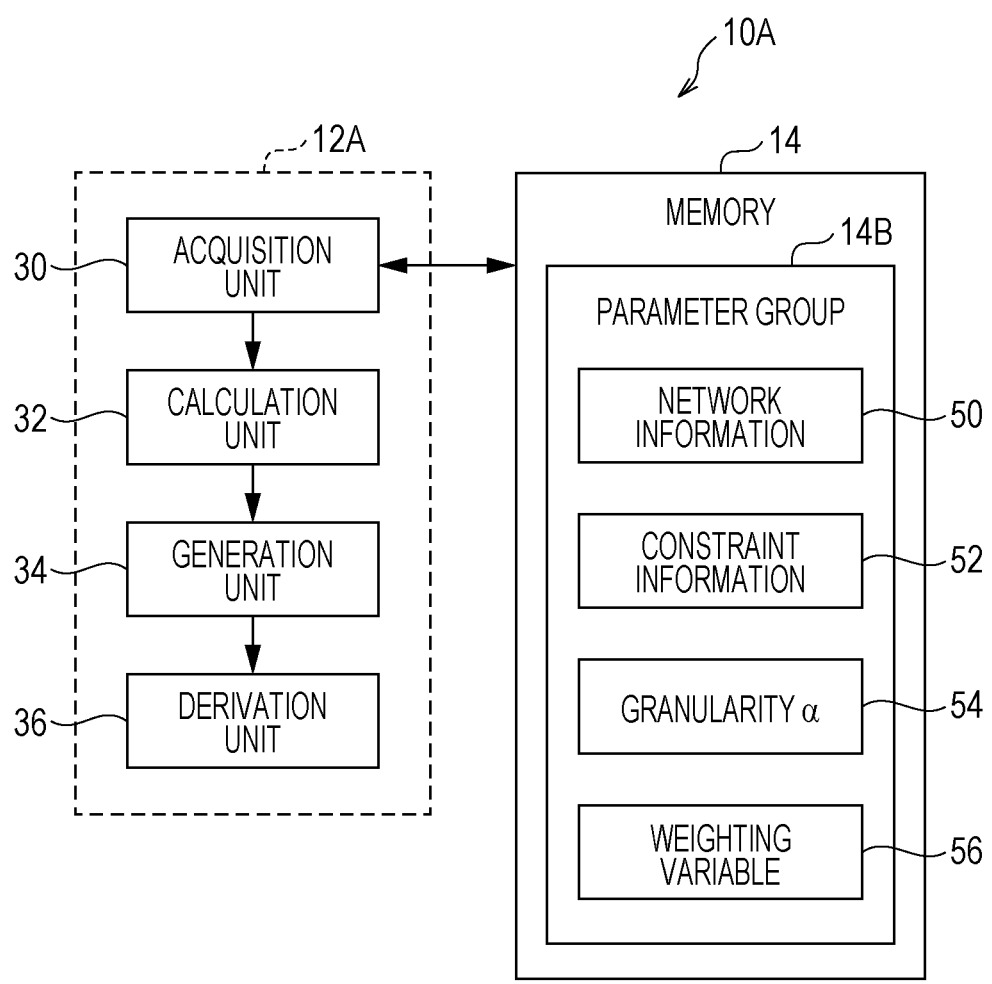
FIG. 6 is a block diagram illustrating an example functional configuration of the information processing apparatus according to the first exemplary embodiment.

The CPU 12A of the information processing apparatus 10A according to this exemplary embodiment functions as the units illustrated in FIG. 6 by loading the information processing program 14A stored in the memory 14 into the RAM 12C and by running the information processing program 14A.

FIG. 6 is a block diagram illustrating an example functional configuration of the information processing apparatus 10A according to the first exemplary embodiment.

As illustrated in FIG. 6, the CPU 12A of the information processing apparatus 10A according to this exemplary embodiment functions as an acquisition unit 30, a calculation unit 32, a generation unit 34, and a derivation unit 36.

The memory 14 according to this exemplary embodiment stores the parameter group 14B as described above. The parameter group 14B includes network information 50, constraint information 52, granularity α54, and a weighting variable 56.

The acquisition unit 30 according to this exemplary embodiment acquires the network information 50, the constraint information 52, the granularity α 54, and the weighting variable 56 from the parameter group 14B. Note that the application of the MDMC method is described in this exemplary embodiment, but the method in the exemplary embodiment is not limited to the MDMC method.

The network information 50 is an example of information including information regarding multiple nodes and information regarding multiple links connecting the multiple nodes. For example, hypertext markup language (HTML) data representing mutual reference, friendship data, and the like are applied to the network information 50. It suffices that the network information 50 indicates at least a relationship of a linkage between nodes (a relationship between a node and a link). The network information 50 does not have to indicate specific content of the node (such as the content of HTML data).

The constraint information 52 is information regarding node pairs included in the multiple nodes, the information including the positive and negative constraints. The constraint information 52 is expressed as, for example, a constraint matrix C illustrated in FIG. 9 (described later).

The granularity α 54 is a variable for determining the sizes of clusters into which the multiple nodes are classified and is expressed as a positive real number. The weighting variable 56 is a variable for determining the weighting for the constraint information 52 and is expressed as a real number larger than or equal to 0 (zero). Although the granularity α 54 and the weighting variable 56 are stored in advance in the memory 14 in this exemplary embodiment, the user may input the granularity α 54 and the weighting variable 56 with the operation unit 18. When a method that does not include the granularity α 54 and that is other than the MDMC method is applied, the granularity a 54 may be used as a fixed number, instead of the variable. In addition, the weighting variable 56 does not have to be used, and the configuration not including the weighting variable 56 may be used.

Figure 7:
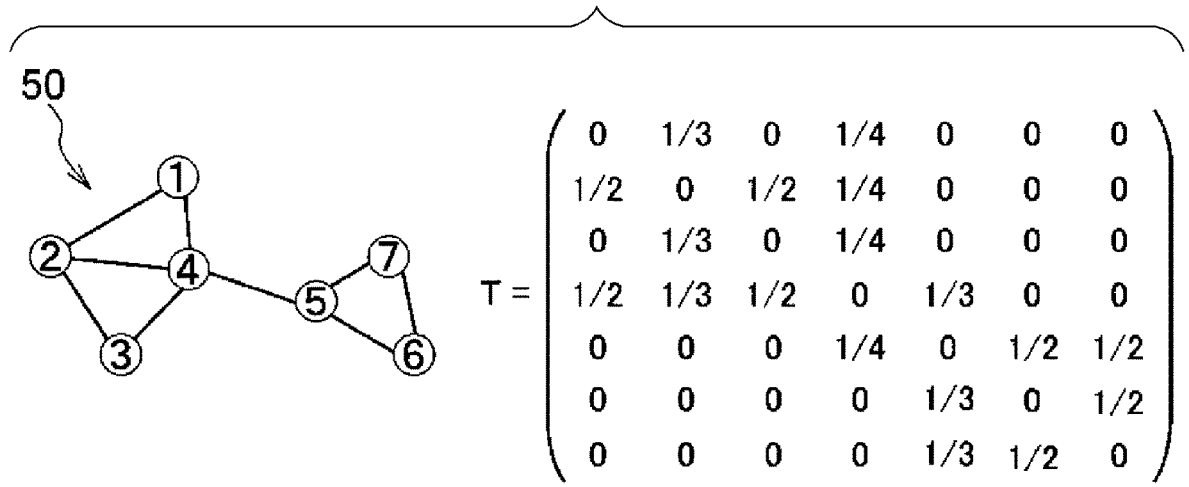
FIG. 7 is a diagram illustrating an example of network information according to the first exemplary embodiment.

FIG. 7 is a diagram illustrating an example of the network information 50 according to this exemplary embodiment.

The network information 50 illustrated in FIG. 7 includes information regarding, for example, seven nodes and nine links.

The nodes illustrated in FIG. 7 are numbered from 1 to 7. For example, the node with number 1 (hereinafter, expressed as the node [1]) has links with the node [2] and the node [4]. Although the network having the seven nodes is described for simplicity in this exemplary embodiment, the number of nodes and the number of links may be more than seven and may be, for example, about 100,000. Each link between the nodes is not a directed link in this exemplary embodiment, but the link may be a one-way link.

A matrix T illustrated in FIG. 7 represents transition probabilities in the case of random transitions between the nodes through the links. For example, in a case of a random transition from the node [1] to another node through a link, probabilities of the transitions to the node [2] and the node [4] are ½ and ½, respectively. A first column of the matrix T represents the transition probabilities of these transitions. The other elements of the matrix T are also arranged in the same manner. Suppose a case where a matrix A is used in which $A_{nm}=1$ holds true in the presence of a linkage between a node [n] and a node [m] through a link and in which $A_{nm}=0$ holds true in the absence of the linkage, and where the total number of nodes is N. In this case, the matrix T is generally expressed by Formula (1) below. Since the total sum of the transition probabilities is 1, $\Sigma_n T_{nm}=1$ holds true for any node [m].

$$T_{nm} = \frac{A_{nm}}{\sum_{s=1}^{N} A_{sm}} \quad (1)$$

The calculation unit 32 according to this exemplary embodiment calculates, for each of the multiple clusters, a classification proportion into which the multiple nodes are classified and calculates a degree of importance of each of the multiple clusters. The classification proportion represents a proportion in which each of the multiple nodes is classified as one of the multiple clusters.

The generation unit 34 according to this exemplary embodiment generates a probability model for performing the probabilistic clustering on the multiple nodes. The probability model is generated by using the network information 50, the constraint information 52, the aforementioned classification proportion, the aforementioned degree of importance, the granularity α 54, and the weighting variable 56. Note that how the probability model is generated specifically will be described later.

By using, for example, the expectation-maximization (EM) algorithm, the derivation unit 36 according to this exemplary embodiment derives the classification proportion in maximizing the probability model.

The action of the information processing apparatus 10A according to the first exemplary embodiment will be described with reference to FIG. 8.

Figure 8:
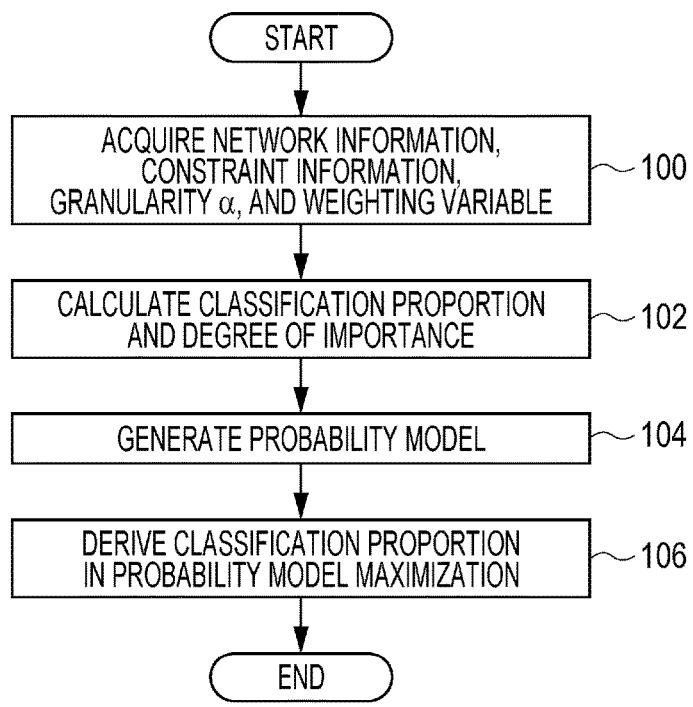
FIG. 8 is a flowchart illustrating an example flow of a process executed by an information processing program according to the first exemplary embodiment.

FIG. 8 is a flowchart illustrating an example flow of a process executed by the information processing program 14A according to the first exemplary embodiment.

First, the user instructs the information processing apparatus 10A to start the probabilistic clustering process, the information processing program 14A is started, and the following steps are performed. In this exemplary embodiment, nodes the number of which is N and that is included in the network are classified into clusters the number of which is K, and thereby the probabilistic clustering process is executed. Note that N and K are positive integers.

In step 100 in FIG. 8, the acquisition unit 30 acquires the network information 50, the constraint information 52, the granularity α 54, and the weighting variable 56 from the parameter group 14B.

Figures 9, 10:
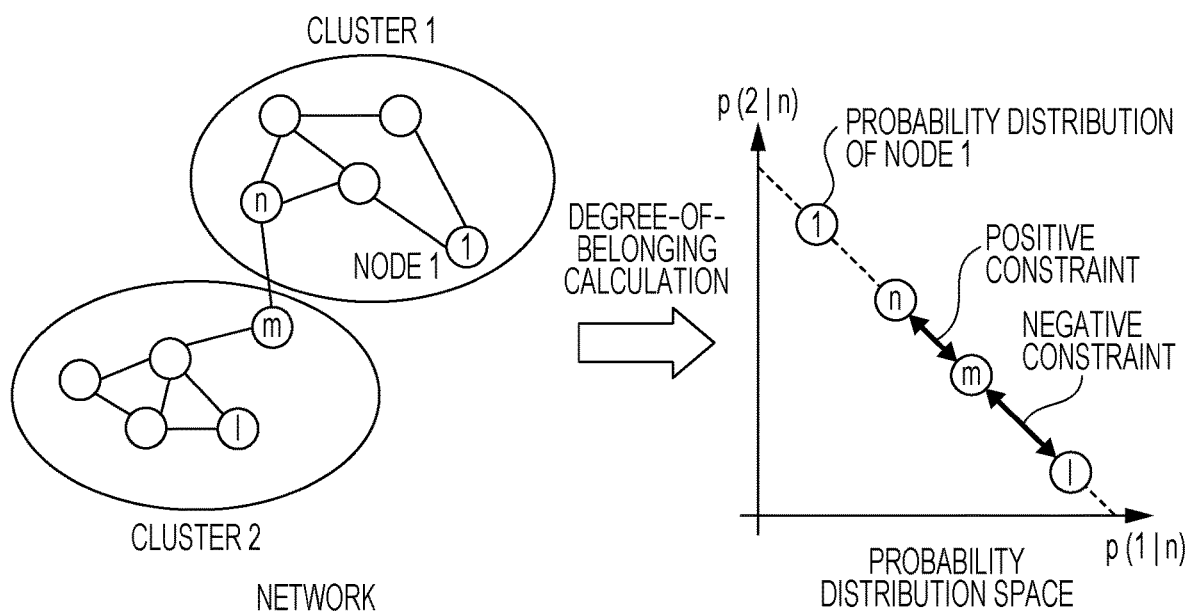
FIG. 9 is a diagram illustrating an example of constraint information according to the first exemplary embodiment.
FIG. 10 is a diagram for explaining an overview of the constraints according to the first exemplary embodiment.

FIG. 9 is a diagram illustrating an example of the constraint information 52 according to the first exemplary embodiment.

As illustrated in FIG. 9, the constraint information 52 according to this exemplary embodiment is expressed as the n×m constraint matrix C for node pairs.

Specifically, the value of each matrix element is denoted as $c_{nm}$ in the constraint matrix C in a case where nodes arranged in a direction along a row (horizontally) are each denoted as a node [m] (m=1, 2, 3, 4 in this exemplary embodiment), and nodes arranged in a direction along a column (vertically) are each denoted as a node [n] (n=1, 2, 3, 4 in this exemplary embodiment). In this exemplary embodiment, the values respectively located in the upper left corner, the upper right corner, the lower left corner, and the lower right corner are denoted as $c_{11}$, $c_{14}$, $c_{41}$, and $c_{44}$, respectively.

In the constraint matrix C illustrated in FIG. 9, the absolute value of $c_{nm}$ represents a degree of a constraint placed between two nodes, and a minus sign represents a negative constraint. For example, the encircled value $c_{23}$ in FIG. 9 is −1, and this indicates that the negative constraint is placed between the node [2] and the node [3]. The constraint matrix C according to this exemplary embodiment represents $c_{nm}=c_{mn}$, a positive constraint for $c_{nm}>0$, no constraint for $c_{nm}=0$, and a negative constraint for $c_{nm}<0$. That is, the following holds true.

$$C = (c_{nm}) \in \mathbb{R}^{n \times n}; c_{nm} = c_{mn}; \begin{cases} c_{nm} > 0; & \text{Positive contraint} \\ c_{nm} = 0; & \text{No constraint} \\ c_{nm} < 0; & \text{Negative constraint} \end{cases} \quad (2)$$

Referring back to FIG. 8, in step 102, the calculation unit 32 calculates the classification proportion and the degree of importance. Specifically, for a cluster [k], the calculation unit 32 calculates a classification proportion p(n|k) in which a node [n] is classified as the cluster [k] and a degree of importance π(k) of the cluster [k]. When calculating the classification proportion p(n|k) and the degree of importance π(k), the calculation unit 32 calculates a proportion $\gamma_d(k)$ of the cluster [k] to the total clusters on the basis of a d-th piece of transit information $\tau_d$. Note that the d-th transit information $\tau_d$ is an N-dimensional vector and has data items the number of which is D and that are $\tau_1, \tau_2, \ldots, \tau_D$ (D is an integer).

In step 102, the calculation unit 32 calculates a stationary probability distribution $p^{st}(n)$ in random transitions between nodes in the network indicated by the network information 50. The stationary probability distribution $p^{st}(n)$ is obtained by simultaneous N-th degree equations expressed by Formula (3) below. The stationary probability distribution $p^{st}(n)$ is the eigenvector of the matrix T and has an eigenvalue of 1.

$$p^{st}(n) = \sum_{m=1}^{N} T_{nm} p^{st}(m) \quad (3)$$

Note that a network including a one-way link has trouble such as a so-called rank sink in some cases, and thus only a specific node has a value in the stationary probability distribution. In such a case, Formula (3) above may be modified, and the stationary probability distribution $p^{st}(n)$ may be obtained by using, for example, the relation $p^{st}(n) = (1-r)\Sigma_m T_{nm} p^{st}(m) + r$. Note that r is a real number from 0 to 1 and represents a probability of random transition between nodes without passing through a link.

Subsequently, multiple pieces of transit information $\tau_{nd}$ representing transit nodes in random transitions between the multiple nodes through the multiple links are generated. In this exemplary embodiment, the transit information is generated on the basis of $\tau_{nd}=1$ determined for a node [n] and $\tau_{md}=1$ determined for a node M. The node [n] is selected in accordance with the stationary probability distribution $p^{st}(n)$, and the node [m] is selected in accordance with $T_{nm}$ denoting a probability of transition from the node [n] to the node [m]. Such an N-dimensional vector is generated D times. The transit information $\tau_{nd}$ is provided as an amount satisfying $\Sigma_n \tau_{nd}=2$. The transit information $\tau_{nd}$ is provided on the assumption that a virtual agent is found on a link between the node [n] and the node M when the virtual agent randomly transitions between nodes through links.

The calculation unit 32 according to this exemplary embodiment calculates the classification proportion p(n|k) and the degree of importance π(k) through sequential computation. Before the sequential computation is started, $p_0(n|k)$, $\pi_0(k)$, and $\gamma_{0(d)}(k)$ are temporarily determined, and values satisfying $\Sigma_n p_0(n|k)=1$ and $\Sigma_k \pi_0(k)=1$ are given. Since $p_0(n|k)$ denotes a proportion in which a node n (n=1 to N) is classified as a cluster k (k=1 to K), positive real numbers the number of which is (K×N−1) are given in the temporary determination. Note that −1 is given because of the condition $\Sigma_n p_0(n|k)=1$. Since $\pi_0(k)$ denotes the degree of importance of a cluster classified as k (k=1 to K) in the network, positive real numbers the number of which is (K−1) are given in the temporary determination. Since $\gamma_{0(d)}(k)$ is a coefficient that represents the proportion of the cluster [k] to the total clusters and that is determined in accordance with the transit information $\tau_{nd}$ (d=1 to D), positive real numbers the number of which (K×D) are given in the temporary determination.

A classification proportion $p_t(n|k)$ is first calculated in the t-th computation in the sequential computation. Note that t is expressed as a positive integer and denotes the sequential computation count. The classification proportion $p_t(n|k)$ is calculated from $p_{t-1}(n|k)$, $\pi_{t-1}(k)$, and $\gamma_{t-1(d)}(k)$ that are obtained in a sequential computation preceding the t-th sequential computation. For example, in the first sequential computation performed after the temporary determination, $p_1(n|k)$ is obtained by using $p_0(n|k)$, $\pi_0(k)$, and $\gamma_{0(d)}(k)$.

The calculation unit 32 according to this exemplary embodiment calculates the classification proportion $p_t(n|k)$ in the t-th sequential computation in accordance with the relation determined by Formula (4) below.

$$p_t(n|k) = \frac{\alpha}{\alpha + 2D_{t-1}(k)} \sum_{m=1}^{N} T_{nm} P_{t-1}(m|k) + \frac{1}{\alpha + 2D_{t-1}(k)} \sum_{d=1}^{D} \gamma_{t-1(d)}(k) \tau_{nd} \quad (4)$$

Note that α denotes the granularity α 54 described above and is expressed as a positive real number. In this exemplary embodiment, the granularity α 54 serves as a parameter. The decomposition granularity becomes finer as α approaches 0 and becomes coarser as α approaches infinity. In addition, $D_{t-1}(k)$ is a coefficient determined from $\gamma_{t-1(d)}(k)$ and $D_{t-1}(k) = \Sigma_d \gamma_{t-1(d)}(k)$ holds true.

The classification proportion $p_t(n|k)$ is calculated from values of a first contribution (the first term in the right-hand side) and a second contribution (the second term in the right-hand side). The value of the first contribution becomes high as a classification proportion $p_{t-1}(m|k)$ of the cluster [k]

for the node (the node [m] with $T_{nm} \neq 0$) having a link with the node [n] becomes high. The value of the second contribution becomes high as the proportion $\gamma_{t-1(d)}(k)$ of the cluster [k] to the total clusters becomes high.

The first contribution is determined from a first coefficient $\alpha/(\alpha+2D_{t-1}(k))$ and the preceding classification proportion $p_{t-1}(m|k)$ calculated for the node (the node [m] with $T_{nm} \neq 0$) having a link with the node [n]. The first coefficient approaches 1 as the granularity $\alpha$ 54 is made coarser, that is, as $\alpha$ is made closer to infinity. The second contribution is determined from a second coefficient $1/(\alpha+2D_{t-1}(k))$, the multiple pieces of transit information $\tau_{nd}$, and the proportion $\gamma_{t-1(d)}(k)$ of the cluster [k] to the total components. The second coefficient approaches 0 as the granularity $\alpha$ 54 is made coarser, that is, as $\alpha$ is made closer to infinity. As to be described below, the proportion $\gamma_{t-1(d)}(k)$ of the cluster [k] to the total clusters is calculated from the classification proportion $p_{t-1}(n|k)$ and the degree of importance $\pi_{t-1}(k)$ that are obtained in the preceding calculation.

Subsequently, the proportion $\gamma_{td}(k)$ of the cluster [k] to the total clusters is calculated from the classification proportion $p_{t-1}(n|k)$ and the degree of importance $\pi_{t-1}(k)$ that are obtained in the preceding calculation and the multiple pieces of transit information $\tau_{nd}$. In this exemplary embodiment, the proportion $\gamma_{td}(k)$ is calculated by Formula (5) below. A cluster having a relatively high degree of importance among the clusters takes on a high value of the proportion $\gamma_{td}(k)$.

$$\gamma_{td}(k) = \frac{\pi_{t-1}(k) \prod_{n=1}^{N} [p_{t-1}(n|k)]^{\tau_{nd}}}{\sum_{j=1}^{K} \pi_{t-1}(j) \prod_{m=1}^{N} [p_{t-1}(m|j)]^{\tau_{md}}} \quad (5)$$

Further, the calculation unit 32 according to this exemplary embodiment calculates the degree of importance $\pi_t(k)$ of the cluster [k] in the network. The degree of importance $\pi_t(k)$ is calculated in such a manner as to take on a high value as the proportion $\gamma_{td}(k)$ of the cluster [k] to the total clusters becomes high. In this exemplary embodiment, the degree of importance $\pi_t(k)$ of the cluster [k] is calculated by Formula (6) below.

$$\pi_t(k) = \frac{D_{t-1}(k)}{\sum_{j=1}^{K} D_{t-1}(j)}, \ D_{t-1}(k) = \sum_{d=1}^{D} \gamma_{t-1(d)}(k) \quad (6)$$

In accordance with Formulas (4), (5), and (6) above, the classification proportion $p_t(n|k)$, the degree of importance $\pi_t(k)$, and the proportion $\gamma_{td}(k)$ are calculated from the classification proportion $p_{t-1}(n|k)$, the degree of importance $\pi_{t-1}(k)$, and the proportion $\gamma_{t-1(d)}(k)$ that are obtained in the preceding calculation and from the transit information $\tau_{nd}$.

In step 104, the generation unit 34 generates a probability model Q' for performing the probabilistic clustering on the multiple nodes, by using the network information 50, the constraint information 52, the granularity $\alpha$ 54, and the weighting variable 56 acquired in step 100 and the classification proportion $p_t(n|k)$ and the degree of importance $\pi_t(k)$ calculated in step 102. In this exemplary embodiment, the probability model Q' is calculated by Formula (7) below.

$$Q' \equiv \sum_{k=1}^{K} \sum_{d=1}^{D} \gamma_{td}(k) \log(\pi_t(k)) + \quad (7)$$

-continued
$$\sum_{k=1}^{K} \sum_{n=1}^{N} \left[ \alpha \sum_{m=1}^{N} T_{nm} p_{t-1}(m|k) + \sum_{d=1}^{D} \gamma_{td}(k) \tau_{nd} \right]$$
$$\log(p_t(n|k)) - W U_{nm}$$

$$U_{nm} = \sum_{n=1}^{N} \sum_{m=1}^{N} c_{nm} \sum_{k=1}^{K} p_{t-1}(k|m) \log \frac{p_{t-1}(k|m)}{p_t(k|n)}$$

Note that W denotes a weighting variable 54; $c_{nm}$, the constraint information 52 expressed by the constraint matrix C; and $U_{nm}$, a constraint term expressed by using the constraint information 52.

The constraint term $U_{nm}$ is obtained by multiplying a distance between degrees of belonging by values indicated by the constraint information 52. The degrees of belonging respectively correspond to the distribution of a probability at which one of each node pair belongs to each cluster and the distribution of a probability at which the other of the node pair belongs to each cluster. A degree of belonging p(k|n) to which the node [n] belongs to the cluster [k] takes on a high value as the classification proportion p(n|k) in which the node [n] is classified as the cluster [k] becomes high. In this exemplary embodiment, the degree of belonging p(k n) is calculated by Formula (8) below.

$$p(k|n) = \frac{\pi(k) p(n|k)}{\sum_{j=1}^{K} \pi(j) p(n|j)} \quad (8)$$

As read from Formula (8) above, the degree of belonging p(k|n) satisfies $\Sigma_k p(k|n)=1$. In other words, degrees of belonging to which a node belongs to each cluster add up to 1. The degree of belonging p(k|n) is an amount of a degree of belonging of the node [n] to the cluster [k], the amount being measured relative to the total clusters.

A distance between the degree of belonging p(k|n) of the node [n] and the degree of belonging p(k|m) of the node [m] is expressed as Formula (9) below by using, for example, the Kullback-Leibler (KL) divergence.

$$KL(p_{t-1}(k|m) \| p_t(k|n)) \geq 0 \quad (9)$$

Accordingly, the constraint term $U_{nm}$ in Formula (7) above may be described as Formula (10) below on the basis of Formula (9) above.

$$U_{nm} = \Sigma_n \Sigma_m \{ c_{nm} \times KL(p(k|m) \| p(k|n)) \} \quad (10)$$

As described above, particularly the negative constraint is not allowed to be directly adopted to the probabilistic clustering process in the network. Accordingly, in this exemplary embodiment, a degree of belonging of each node to a cluster is first calculated, and a positive or negative constraint is placed on the calculated degree of belonging. An overview of the constraints will be described with reference to FIG. 10.

FIG. 10 is a diagram for explaining the overview of the constraints according to this exemplary embodiment.

In the graph in the right part of FIG. 10, the horizontal axis represents a degree of belonging p(1|n) of the node [n] to a cluster [1], and the vertical axis represents a degree of belonging p(2|n) of the node [n] to a cluster [2].

As illustrated in FIG. 10, the positive constraint acts to have a short distance between probability distributions represented as degrees of belonging. In the example illustrated in FIG. 10, the positive constraint acts between the node [n] and the node [m]. In contrast, the negative constraint acts to have a long distance between probability distributions represented as degrees of belonging. In the example illustrated in FIG. 10, the negative constraint acts between the node [m] and the node [1].

Referring back to FIG. 8, in step 106, the derivation unit 36 uses the EM algorithm and thereby derives the classification proportion p(n|k) in maximizing the probability model Q', and the series of steps of the process executed by the information processing program 14A is terminated. Note that the classification proportion p(n|k) in this exemplary embodiment is obtained as a value by using the non-linear programming method. Examples of the non-linear programming method include the primal-dual interior point method, the exterior penalty method, and the multiplier method.

The case of applying the probability model using the MDMC method has heretofore been described in the exemplary embodiment. However, any probability model satisfying the form of Q described below (general expression for Q) is applicable to the exemplary embodiment.

$$\text{Likelihood function } L = P(T \mid \pi, \{\{p(n \mid k)\}\}, \alpha)R(\{\{p(n \mid k)\}\} \mid C)^W = \quad (11)$$
$$P(T \mid \pi, \{\{p(n \mid k)\}\})P(\{\{p(n \mid k)\}\} \mid \alpha)R(\{\{p(n \mid k)\}\} \mid C)^W$$
$$Q = \log L = \log P(T \mid \pi, \{\{p(n \mid k)\}\}, \alpha) + W \log R(\{\{p(n \mid k)\}\} \mid C) =$$
$$\log P(T \mid \pi, \{\{p(n \mid k)\}\}) +$$
$$\log P(\{\{p(n \mid k)\}\} \mid \alpha) + W \log R(\{\{p(n \mid k)\}\} \mid C)$$

Note that T denotes the matrix representing the transition probability expressed by using Formula (1) above; $\pi$, the degree of importance expressed by Formula (6) above; $\alpha$, the granularity $\alpha$ 54; C, the constraint matrix expressed by Formula (2) above; W, the weighting variable 56; and $\{\{p(n|k)\}\}$, the classification proportion expressed by Formula (4) above.

$$\{\{p(n|k)\}\} = \{\{p(1|k)\}, \{p(2|k)\}, \ldots, \{p(n|k)\}\}$$
$$\{p(n|k)\} = \{p(n|1), p(n|2), \ldots, p(n|k)\} \quad (12)$$

The granularity $\alpha$ 54 is used as a variable in the exemplary embodiment. However, in a probability model that does not include the variable a and that is other than the probability model using the MDMC method, the granularity $\alpha$ 54 may be used as a fixed value and may be derived as a special example of Q.

As described above, this exemplary embodiment enables a highly accurate probabilistic clustering process to be executed in consideration of the positive and negative constraints.

Second Exemplary Embodiment

The case where the classification proportion p(n|k) is obtained as a value by using the non-linear programming method has heretofore been described in the first exemplary embodiment. In a second exemplary embodiment, a case where the classification proportion p(n|k) is analytically obtained will be described.

Figure 11:
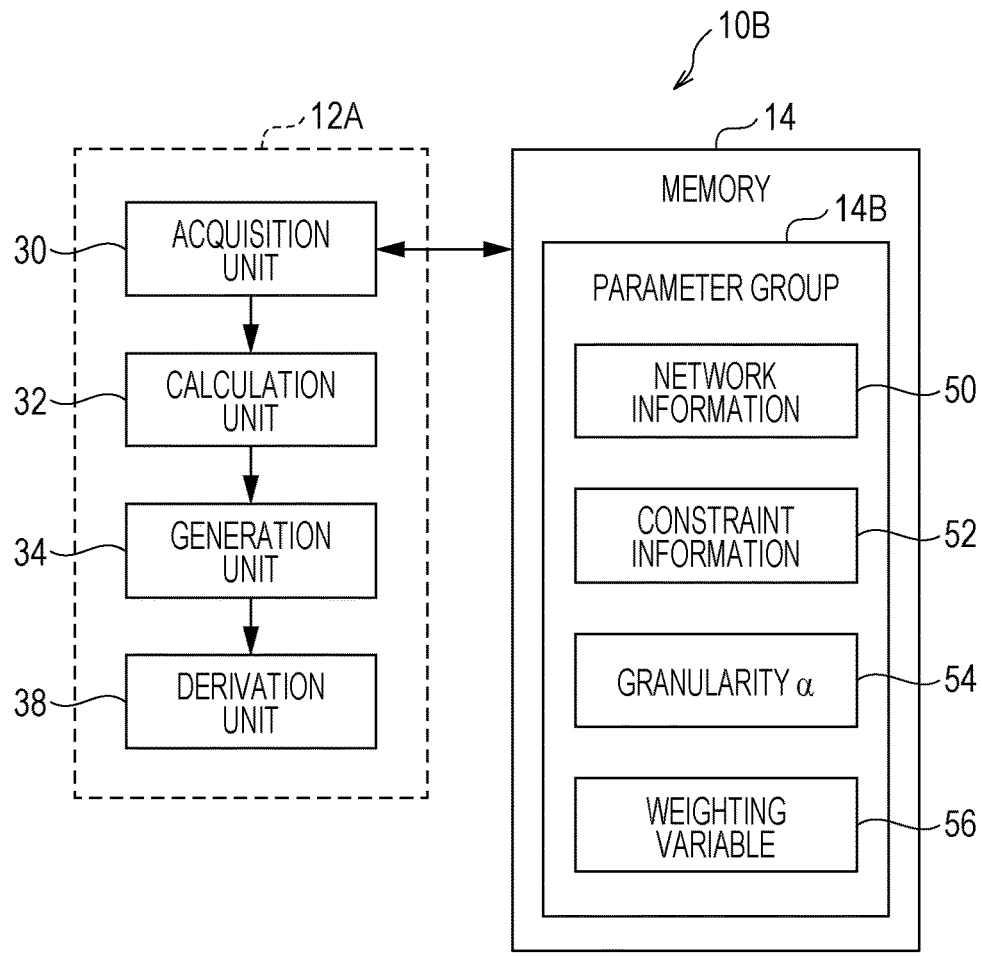
FIG. 11 is a block diagram illustrating an example functional configuration of an information processing apparatus according to a second exemplary embodiment.

FIG. 11 is a block diagram illustrating an example functional configuration of an information processing apparatus 10B according to the second exemplary embodiment.

As illustrated in FIG. 11, the CPU 12A of the information processing apparatus 10B according to this exemplary embodiment functions as the acquisition unit 30, the calculation unit 32, the generation unit 34, and a derivation unit 38. Since the acquisition unit 30, the calculation unit 32, and the generation unit 34 have the same functions as in the information processing apparatus 10A according to the first exemplary embodiment described above, repeated explanation is herein omitted.

The derivation unit 38 according to this exemplary embodiment analytically derives the classification proportion p(n|k) in maximizing the probability model Q' (see Formula (7)) by using the value $c_{nm}$ located on a diagonal of the constraint matrix C.

The constraint matrix C according to this exemplary embodiment represents $c_{nm} = c_{mn}$, $\Sigma_n c_{nm} = 0$, the positive constraint for $c_{nm} > 0$, no constraint for $c_{nm} = 0$, the negative constraint for $c_{nm} < 0$. That is, the following holds true.

$$C = (c_{nm}) \in \mathbb{R}^{n \times n}; c_{nm} = c_{mn}; \sum_n c_{nm} = 0; \quad (13)$$

$$\begin{cases} c_{nm} > 0; & \text{Positive contraint} \\ c_{nm} = 0; & \text{No constraint} \\ c_{nm} < 0; & \text{Negative constraint} \end{cases}$$

The weighting variable W satisfies Formula (14) below.

$$W = \frac{\alpha \sum_{m=1}^N T_{nm} p_{t-1}(m \mid k) + \sum_{d=1}^D \gamma_{td}(k)\tau_{nd}}{-\sum_n c_{nm}} \geq 0 \quad (14)$$

Figure 12:
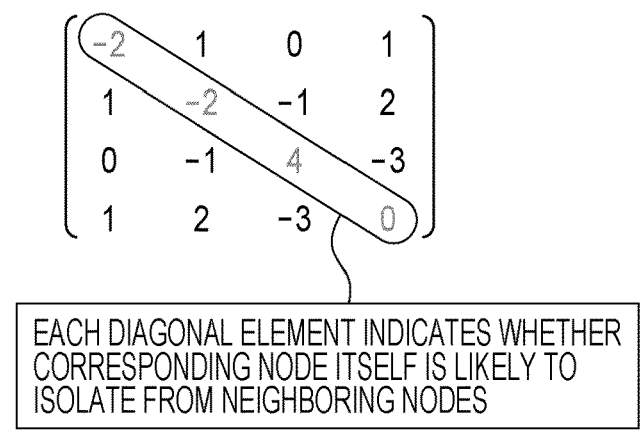
FIG. 12 is a diagram illustrating an example of constraint information according to the second exemplary embodiment.

FIG. 12 is a diagram illustrating an example of the constraint information 52 according to the second exemplary embodiment.

As illustrated in FIG. 12, the constraint information 52 according to this exemplary embodiment is expressed as an n×m constraint matrix C for node pairs, but each value of the corresponding $c_{nm}$ located on the diagonal is different from that of the constraint matrix C illustrated in FIG. 9.

When a value of the constraint matrix C according to this exemplary embodiment is $c_{nm}$, the value $c_{nm}$ located on the diagonal of the constraint matrix C indicates whether a specific node is likely to isolate from neighboring nodes on the basis of the relationship between the specific node and the neighboring nodes. Specifically, a positive value $c_{nm}$ located on the diagonal of the constraint matrix C indicates that the specific node is likely to isolate from the neighboring nodes, and a negative value $c_{nm}$ located on the diagonal of the constraint matrix C indicates that the specific node is less likely to isolate from the neighboring nodes.

For example, as illustrated in FIG. 12, $c_{11}$ and $c_{22}$ of the diagonal elements surrounded by a line ($c_{11}$, $c_{22}$, $c_{33}$, and $c_{44}$) each have a (negative) value of −2, and thus the corresponding nodes [1] and [2] are less likely to isolate from the neighboring nodes. In contrast, $c_{33}$ has a (positive) value of 4, and thus the corresponding node [3] is likely to isolate from the neighboring nodes. Note that $c_{44}$ has a value of 0, and thus the likelihood of the corresponding node [4] is neutral.

In this exemplary embodiment, the classification proportion p(n|k) is analytically obtained by using the EM algorithm described above, specifically, by using Formula (15) below. The classification proportion $p_t(n|k)$ indicates that the calculation is the t-th sequential computation.

$$\left[\alpha\sum_{m=1}^{N} T_{nm}p_{t-1}(m\mid k) + \sum_{d=1}^{D} \gamma_{t-1(d)}(k)\tau_{nd}\right] \quad (15)$$

$$p_t(n\mid k) = \frac{\left(1 + \dfrac{\sum_{m=1}^{N} c_{nm}p_{t-1}(k\mid m)}{-\sum_{m;c_{nm}<0} c_{nm}}\right)}{\alpha + 2D_{t-1}(k)}$$

As described above, this exemplary embodiment enables a highly accurate probabilistic clustering process to be executed in consideration of the positive and negative constraints and further enables the classification proportion to be obtained analytically.

Third Exemplary Embodiment

In a third exemplary embodiment, a case where an unknown constraint in the constraint matrix C for node pairs is predicted without user's input when the constraint matrix C partially has values (including positive and negative values) will be described. It is assumed in this exemplary embodiment that, for example, a network provided with constraints is extended by adding one or more nodes thereto.

Figure 13:
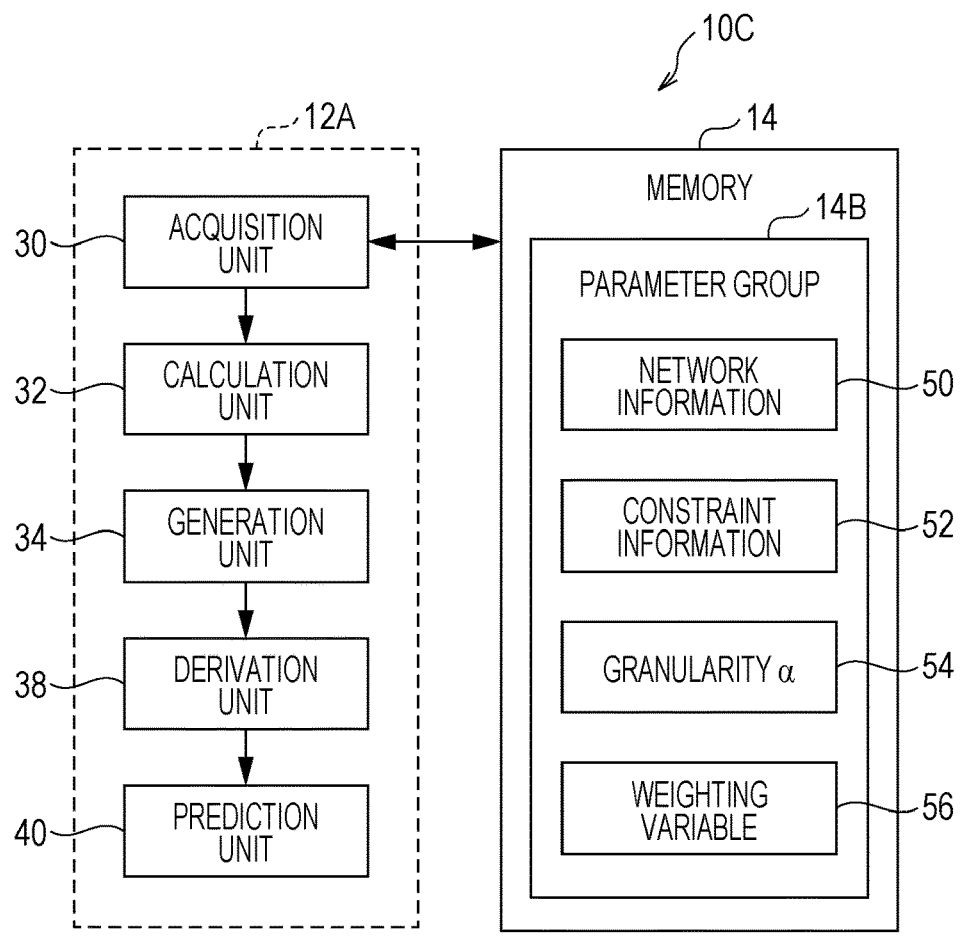
FIG. 13 is a block diagram illustrating an example functional configuration of an information processing apparatus according to a third exemplary embodiment.

FIG. 13 is a block diagram illustrating an example functional configuration of an information processing apparatus 10C according to the third exemplary embodiment.

As illustrated in FIG. 13, the CPU 12A of the information processing apparatus 10C according to this exemplary embodiment functions as the acquisition unit 30, the calculation unit 32, the generation unit 34, the derivation unit 38, and a prediction unit 40. Since the acquisition unit 30, the calculation unit 32, the generation unit 34, and the derivation unit 38 have the same functions as in the information processing apparatus 10B according to the second exemplary embodiment described above, repeated explanation is herein omitted.

The node pairs according to this exemplary embodiment include at least one node with a known constraint and at least one node with an unknown constraint. The prediction unit 40 according to this exemplary embodiment predicts the value of a constraint between a node with a known constraint and a node with an unknown constraint in the constraint matrix C from at least one known value in the constraint matrix C.

Figure 14:
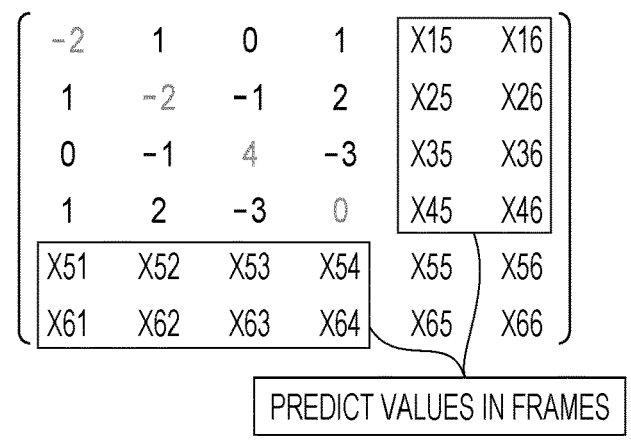
FIG. 14 is a diagram illustrating an example of constraint information according to the third exemplary embodiment.

FIG. 14 is a diagram illustrating an example of the constraint information 52 according to the third exemplary embodiment.

As illustrated in FIG. 14, the constraint information 52 according to this exemplary embodiment is expressed as the constraint matrix C having four nodes with known constraints and two nodes with unknown constraints added to the four nodes.

Specifically, a value $c_{nx}$ of a constraint between a node with an unknown constraint [x] and a node with a known constraint [n] is obtained by Formula (16) below on the basis of, for example, the personalized page rank (PPR) method.

$$c_{nx} = \frac{\sum_{m=1}^{N} c_{nm}\exp(-|S_{nm} - S_{nx}|^2)}{N} \quad (16)$$

Note that $S_{nm}$ denotes one of matrix elements arranged in n rows by m columns in a PPR matrix S; $S_{nx}$, one of matrix elements arranged in the n rows by x columns in the PPR matrix S; N, the number of known nodes; and $c_{nm}$, the value of a constraint between a node [n] and a node [m]. The PPR matrix S is obtained by recursively performing calculation by Formula (17) below until Formula (17) converges.

$$S(t) = dTS(t-1) + (1-d)I_{N+X} \quad (17)$$

Note that T denotes a matrix representing the transition probabilities expressed by Formula (1) above; N, the number of known nodes; X, the number of unknown nodes; d, a random transition parameter; and I, an (N+X)-dimensional unit matrix. The unit matrix I is expressed as a square matrix having diagonal elements and each taking on a value of 1 and the other elements each taking on a value of 0.

This exemplary embodiment enables an unknown constraint in a constraint matrix for node pairs to be predicted without user's input when the constraint matrix partially has values (including positive and negative values).

The information processing apparatus according to each exemplary embodiment has heretofore been described by taking the example. The exemplary embodiment may be implemented in the form of a program to cause a computer to execute the functions of the units of the information processing apparatus. The exemplary embodiment may also be implemented in the form of a computer-readable recording medium storing the program.

The configuration of the information processing apparatus described in the aforementioned exemplary embodiment is an example and may be modified depending on the situation without departing from the spirit of the disclosure.

The process flow of the program described in the exemplary embodiment is also an example. A deletion of an unnecessary step, an addition of a new step, a change of the order of the steps in the process, and the like may be performed without departing from the spirit of the disclosure.

The case where the process according to the exemplary embodiment is implemented by the software configuration by using the computer and by running the program has heretofore been described in the exemplary embodiment, but the exemplary embodiment is not limited to this configuration. The exemplary embodiment may be implemented by, for example, a hardware configuration or a combination of the hardware configuration with the software configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a precessor, configured to:
acquire information including information regarding a plurality of nodes and information regarding a plurality of links connecting the plurality of nodes and that acquires constraint information regarding node pairs included in the plurality of nodes, the constraint information including a positive constraint and a negative constraint;
calculate, for each of a plurality of clusters, a classification proportion into which the plurality of nodes are classified and that calculates a degree of importance of each of the plurality of clusters, the classification proportion representing a proportion in which each of the plurality of nodes is classified as one of the plurality of clusters; and generate a probability model for performing probabilistic clustering on the plurality of nodes, the probability model being generated by using at least each of the information regarding the links, the constraint information, the classification proportion, and the degree of importance.

2. The information processing apparatus according to claim 1, wherein the processor further acquires granularity and a weighting variable for determining weighting of the constraint information, the granularity being a variable for determining a size of each of the plurality of clusters into which the plurality of nodes are classified, and wherein the processor generates the probability model by using the information regarding the links, the constraint information, the classification proportion, the degree of importance, the granularity, and the weighting variable.

3. The information processing apparatus according to claim 1, wherein the probability model includes a constraint term expressed by using the constraint information, and wherein the constraint term is obtained by multiplying a distance between degrees of belonging by values indicated by the constraint information, the degrees of belonging respectively corresponding to a distribution of a probability at which a first node of each node pair belongs to each cluster and a distribution of a probability at which a second node of the node pair belongs to each cluster.

4. The information processing apparatus according to claim 3, wherein the constraint information is expressed as a constraint matrix with n×m for the node pairs, and wherein in a case where C denotes the constraint matrix and $c_{nm}$ denotes a value of the constraint matrix C, the constraint matrix C represents $c_{nm}=c_{mn}$, the positive constraint for $c_{nm}>0$, no constraint for $c_{nm}=0$, and the negative constraint for $c_{nm}<0$.

5. The information processing apparatus according to claim 4, wherein the processor is further configured to:

derive the classification proportion in maximizing the probability model, the classification proportion being derived by using a predetermined non-linear programming method.

6. The information processing apparatus according to claim 3, wherein the constraint information is expressed as a constraint matrix with n×m for the node pairs, and wherein in a case where C denotes the constraint matrix and $c_{nm}$ denotes a value of the constraint matrix C, the constraint matrix C represents $C_{nm}=C_{mn}$, $\Sigma_n c_{nm}=0$, the positive constraint for $c_{nm}>0$, no constraint for $c_{nm}=0$, and the negative constraint for $c_{nm}<0$.

7. The information processing apparatus according to claim 3, wherein the constraint information is expressed as a constraint matrix with n×m for the node pairs, and wherein in a case where C denotes the constraint matrix and $c_{nm}$ denotes a value of the constraint matrix C, the value $c_{nm}$ located on a diagonal of the constraint matrix C indicates whether a specific node is likely to isolate from neighboring nodes on a basis of a relationship between the specific node and the neighboring nodes.

8. The information processing apparatus according to claim 7, wherein a positive value $c_{nm}$ located on the diagonal of the constraint matrix C indicates that the specific node is likely to isolate from the neighboring nodes, and wherein a negative value $c_{nm}$ located on the diagonal of the constraint matrix C indicates that the specific node is less likely to isolate from the neighboring nodes.

9. The information processing apparatus according to claim 6, wherein the processor is further configured to:

analytically derive the classification proportion in maximizing the probability model, the classification proportion being derived by using the value $c_{nm}$ located on a diagonal of the constraint matrix C.

10. The information processing apparatus according to claim 6, wherein each of the node pairs includes a node with a known constraint and a node with an unknown constraint, the processor is further configured to:

predict a value of a constraint between the node with the known constraint and the node with the unknown constraint in the constraint matrix C from a known value in the constraint matrix C.

11. A non-transitory computer readable medium storing a program causing a computer to execute a process comprising:

acquiring information including information regarding a plurality of nodes and information regarding a plurality of links connecting the plurality of nodes and acquiring constraint information regarding node pairs included in the plurality of nodes, the constraint information including a positive constraint and a negative constraint;

calculating, for each of a plurality of clusters, a classification proportion into which the plurality of nodes are classified and calculating a degree of importance of each of the plurality of clusters, the classification proportion representing a proportion in which each of the plurality of nodes is classified as one of the plurality of clusters; and generating a probability model for performing probabilistic clustering on the plurality of nodes, the probability model being generated by using at least each of the information regarding the links, the constraint information, the classification proportion, and the degree of importance.

12. An information processing apparatus comprising:

means for acquiring information including information regarding a plurality of nodes and information regarding a plurality of links connecting the plurality of nodes and acquiring constraint information regarding node pairs included in the plurality of nodes, the constraint information including a positive constraint and a negative constraint;

means for calculating, for each of a plurality of clusters, a classification proportion into which the plurality of nodes are classified and calculating a degree of importance of each of the plurality of clusters, the classification proportion representing a proportion in which each of the plurality of nodes is classified as one of the plurality of clusters; and means for generating a probability model for performing probabilistic clustering on the plurality of nodes, the probability model being generated by using at least each of the information regarding the links, the constraint information, the classification proportion, and the degree of importance.

* * * * *